(12) United States Patent
Rückert et al.

(10) Patent No.: US 6,286,210 B1
(45) Date of Patent: Sep. 11, 2001

(54) METHOD FOR PRODUCING A CYLINDER LINER BLANK TO BE CAST INTO A LIGHT-ALLOY CRANKCASE OF A RECIPROCATING ENGINE

(75) Inventors: Franz Rückert, Ostfildern; Peter Stocker, Sulzbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/485,129
(22) PCT Filed: Jan. 23, 1999
(86) PCT No.: PCT/EP99/00445
 § 371 Date: Apr. 27, 2000
 § 102(e) Date: Apr. 27, 2000
(87) PCT Pub. No.: WO99/43457
 PCT Pub. Date: Sep. 2, 1999

(30) Foreign Application Priority Data

Feb. 25, 1998 (DE) .............................................. 198 07 685

(51) Int. Cl.[7] .............................. B23P 11/00; B23P 25/00; F02B 75/08; B22D 19/00
(52) U.S. Cl. .................................. 29/888.061; 29/888.06; 29/527.5; 123/669; 164/100
(58) Field of Search .................... 29/888.06, 888.061, 29/558, 527.5; 123/193.2, 668, 669; 164/100, 111; 228/17, 135

(56) References Cited

U.S. PATENT DOCUMENTS 2,693,122   11/1954   Fausel .
4,005,991   2/1977    Uebayasi et al. .

FOREIGN PATENT DOCUMENTS 196 34 504 A1   12/1997   (DE) .
0 532 331 A1    3/1993    (EP) .

Primary Examiner—S. Thomas Hughes
Assistant Examiner—Eric Compton
(74) Attorney, Agent, or Firm—Crowell & Moring, LLP

(57) ABSTRACT

Surface activation is intended to ensure that a cylinder liner can be anchored in the casting material of a light-metal crankcase with greater bonding. For surface activation, the surface of the cylinder liner is roughened mechanically. Advantageously, copper particles are also implanted into the treated surface. It is necessary to ensure that the time span between surface activation and casting-in is short. Moreover, the activated surface, as far as possible, should not be touched by hand.

8 Claims, 2 Drawing Sheets

METHOD FOR PRODUCING A CYLINDER LINER BLANK TO BE CAST INTO A LIGHT-ALLOY CRANKCASE OF A RECIPROCATING ENGINE

BACKGROUND OF THE INVENTION

The present invention proceeds from a method for producing a cylinder liner blank to be cast into a light-metal crankcase of a reciprocating engine, with the blank likewise consisting of a light-metal alloy. Such a method is contained, for example, in the applicant's prior, not previously published, German application DE 196 34 504 A1. Although the method of this older application affords an improvement on known methods, as compared with the prior art, the fundamental aim, on an industrial scale, is to achieve a further improvement not only of the method, but also of the product produced by the method. The principle of mechanical roughening prior to the casting of the blank into the light-metal casting is basically an advantageous step of the method, but it still needs further refinements and differentiations in order to optimize the method even further.

SUMMARY OF THE INVENTION

The object of the present invention is, therefore, to improve the generic method to the effect that an even greater bonding of the at least one blank to the light-metal crankcase can be achieved. The separate production of a blank and the casting of the latter into a light-metal crankcase are carried out, as a rule, because the blank consists of a different light-metal alloy from the casting material of the light-metal crankcase.

Only when the large-area bonding of each cylinder liner to the light-metal casting material of the crankcase is ensured are special benefits achieved later when the engine equipped with this crankcase is in operation. These benefits are, above all, uniform heat transmission, a uniform temperature profile of the cylinder liner in the circumferential and the axial directions and lower thermally induced cylinder distortion. Moreover, many other advantages are associated with this, these emerging, above all, from the prior German application mentioned.

The essence of the improvement in the proposed method is, in general, a roughening of that surface of the blank or blanks which comes into direct contact with the casting material. It is proposed, in detail, that surface activation be carried out by rolling using a roll or roller which is made of a hard material and is roughened in a sharp-edged manner and which, when it rolls on the surface, roughens the blank.

An advantageous development of the method results because the copper particles referred to are conducive to the fusion of the treated surface parts during the casting-in operation. Materially integral casting over the full 100% surface is achieved with a high degree of process reliability by coppering over the entire surface.

A further development is that the time span between surface activation and the casting-in of the components is less than approximately 5 hours. The production process therefore has to be controlled in such a way that this maximum time is not exceeded, but is preferably substantially undercut. To be precise, the drawing indicates that bonding decreases more and more with increasing time, and because of this, as stated, the aim is to fall as far short of the maximum time mentioned as possible.

It is particularly advantageous, in this case, if surface activation takes place directly before the casting-in of the blanks, and the time span between surface activation and the casting-in operation corresponds approximately to the cycle time of the casting-in process.

For the blanks produced according to the method steps explained above and therefore also the final product, specifically the light-metal crankcase with cast-in liners, it is particularly important, with regard to the sought-after quality and the desired advantages, that the surface activation achieved is maintained until the casting-in of the blanks and is not impaired again, or even lost, for example on the way into the casting mould.

The invention is also explained below with reference to an exemplary embodiment illustrated in the drawings.

DESCRIPTION OF THE PREFERRED EMBODIMENT

Figure 1:
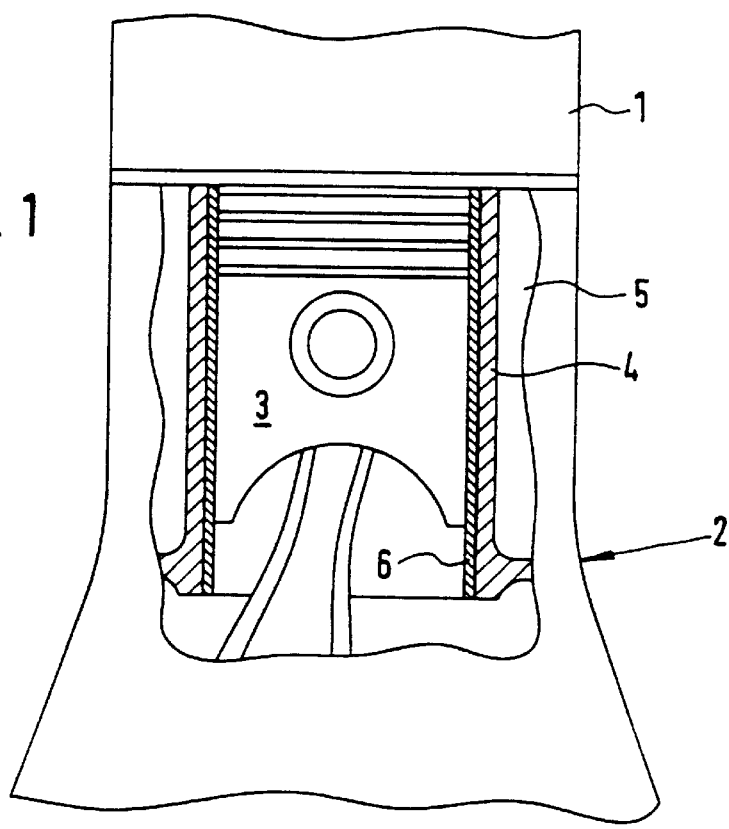
FIG. 1 shows a partial sectional view of a reciprocating engine with a cast-in cylinder liner.
Figure 2:
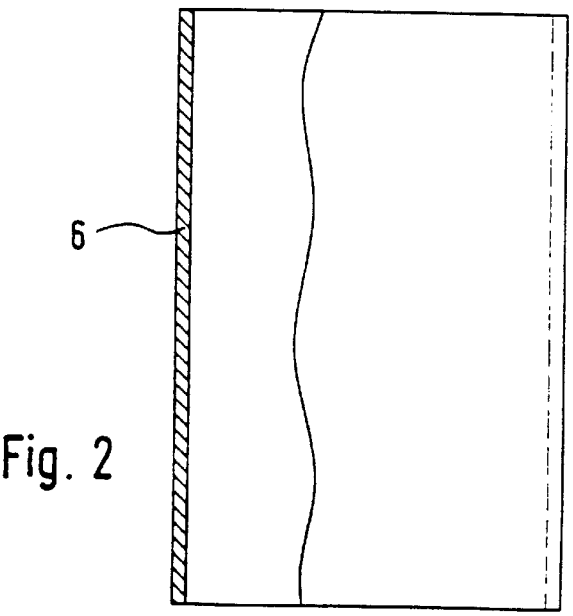
FIG. 2 shows, illustrated individually, the blank of the cylinder liner for the reciprocating engine according to FIG. 1.

The reciprocating engine specially illustrated in FIG. 1 contains a die-cast crankcase 2, in which upwardly exposed cylinder jackets 4 (of the so-called open-deck design) are arranged for receiving a cylinder liner 6 and have a piston 3 guided movably up and down in them. A cylinder head 1, together with the devices for charge exchange and charge ignition, is mounted on top of the crankcase 2, with a cylinder-head gasket being interposed. A cavity for forming a water jacket 5 for cylinder cooling is provided around the cylinder jacket 4 within the crankcase.

The cylinder liner 6 is produced beforehand, as an individual part, from an aluminum/silicon alloy by a method of no further interest here, is then improved in the above-described way by the method according to the invention and is finally cast into the crankcase 2 and machine-finished jointly with the crankcase.

It is important during the casting of the cylinder liner into the crankcase that a good undisturbed materially integral bond between the liner material and the case material is made over as large a proportion of the surface as possible. This is ensured by the roughening described and by the further treatment of the blank surface in accordance with the statements made above.

Figure 3:
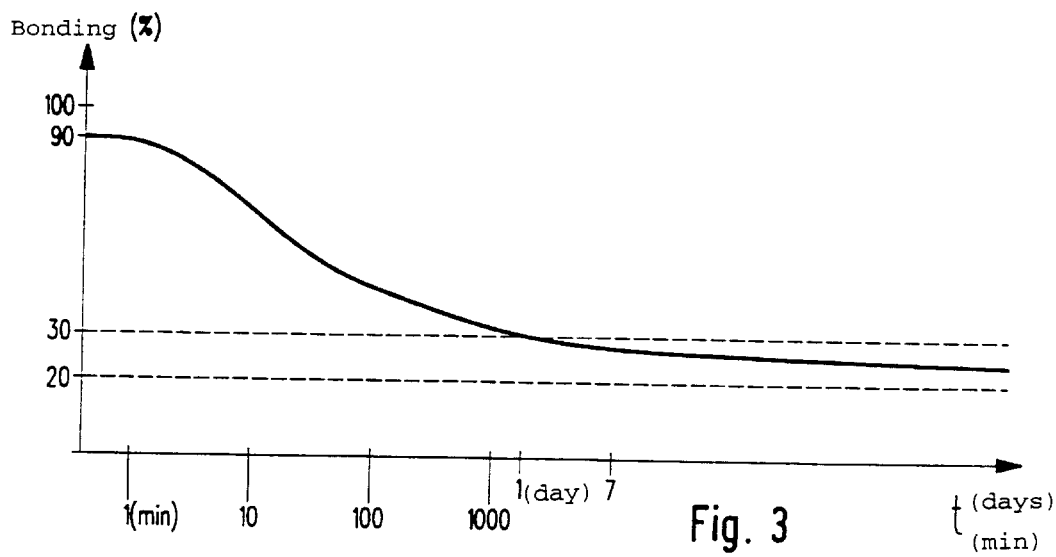
FIG. 3 shows the profile of the bonding process, as seen over time.
Figure 4:
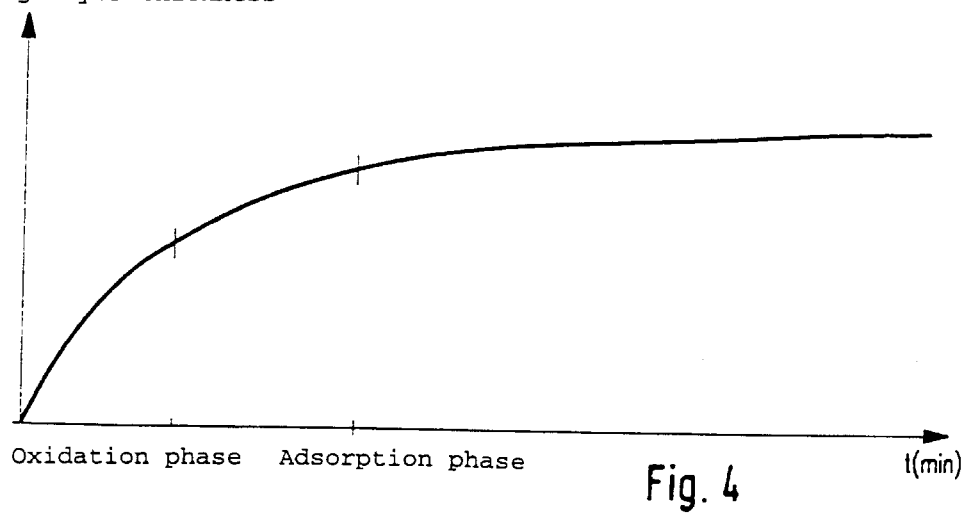
FIG. 4 shows the profile of the covering-layer thickness, likewise as seen over time.

It can be seen from FIG. 3 that bonding is of the order of magnitude of 90% if casting is carried out immediately after blasting. For example, after one day, bonding is only of the order of magnitude of 30%. This results in the refinement of the method.

As bonding decreases with increasing time, there is an increase in the covering-layer thickness to a certain maximum value. The oxidation phase, which leads to a good covering-layer thickness in a short time, is followed by the adsorption phase, in which the covering layer increases decisively again. Only a slight increase in the covering-layer thickness takes place subsequently.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for the production of blanks of a cylinder liner which consist of a light-metal alloy and are to be cast into a light-metal crankcase of a reciprocating engine, comprising:

producing and machining a tubular blank to a desired shape and a desired dimension, roughening the blank outer surface to be cast into the material of the light-metal crankcase to activate the surface of the blank to be cast for casting purposes by rolling using a roll or roller which is made of a hard material and is roughened in a sharp-edged manner and which, when rolling on the surface, roughens the blank, and impressing an excess of fine copper particles on the surface to be treated mechanically into the treated surface to thus implant the copper particles mechanically so that casting the blank in the crankcase can take place immediately after surface activation and the time span between surface activation and casting the blank in can correspond approximately to a cycle time of the process of casting the blank in.

2. The method according to claim 1, wherein, after surface activation, the blanks are handled only by way of metallic grippers which consist of copper at the locations at which they come into contact with the treated surface of the blanks.

3. The method according to claim 1 wherein casting the blank in is to take place in less than five hours.

4. The method according to claim 1 wherein activating the surface takes place in the presence of said excess of fine copper particles on the surface to be treated, and wherein the copper particles are pressed partially into the surface of the blank while being implanted mechanically.

5. The method according to claim 1, wherein, after activating the surface, the blanks are treated so as to protect the surface and are not touched by hand on the treated surface.

6. The method according to claim 1, wherein, after activating the surface, the blanks are grasped directly or indirectly only on untreated surfaces.

7. The method according to claim 1, wherein, after activating the surface, the blanks are grasped for handling purposes only by metallic gripping systems which touch the parts at only three locations.

8. The method according to claim 1, wherein, after activating the surface, the treated blanks are brought into contact only with copper for the purpose of handling the blanks.

* * * * *